United States Patent
Sievers

(10) Patent No.: US 9,611,521 B2
(45) Date of Patent: Apr. 4, 2017

(54) EXTRACTION OF GALLIUM AND/OR ARSENIC FROM GALLIUM ARSENIDE

(71) Applicant: EMPIRE TECHNOLOGY DEVELOPMENT LLC, Wilmington, DE (US)

(72) Inventor: Michael R. Sievers, Frederick, CO (US)

(73) Assignee: Empire Technology Development LLC, Wilmington, DE (US)

( * ) Notice: Subject to any disclaimer, the term of this patent is extended or adjusted under 35 U.S.C. 154(b) by 527 days.

(21) Appl. No.: 14/074,329

(22) Filed: Nov. 7, 2013

(65) Prior Publication Data

US 2014/0061982 A1 Mar. 6, 2014

Related U.S. Application Data

(62) Division of application No. 13/388,142, filed as application No. PCT/US2011/032827 on Apr. 18, 2011, now Pat. No. 8,603,216.

(51) Int. Cl.
C22B 58/00 (2006.01)
C22B 30/04 (2006.01)
C22B 7/00 (2006.01)

(52) U.S. Cl.
CPC .............. *C22B 58/00* (2013.01); *C22B 7/001* (2013.01); *C22B 30/04* (2013.01); *Y02P 10/214* (2015.11)

(58) Field of Classification Search
CPC ......... C22B 30/04; C22B 58/00; C22B 7/001; Y02P 10/214

USPC .... 266/99, 144, 171; 75/586, 671, 688, 706; 134/19
See application file for complete search history.

(56) References Cited

U.S. PATENT DOCUMENTS

| 3,170,857 A | 2/1965 | Dötzer et al. |
| 3,301,638 A | 1/1967 | Summergrad |
| 4,362,560 A | 12/1982 | Abrjutin et al. |

(Continued)

FOREIGN PATENT DOCUMENTS

| CN | 101413065 A | 4/2009 |
| CN | 101413605 A | 4/2009 |

(Continued)

OTHER PUBLICATIONS

International Search Report and Written Opinion for PCT/US2011/032827 dated Jul. 21, 2011.

(Continued)

*Primary Examiner* — Scott Kastler
*Assistant Examiner* — Michael Aboagye
(74) *Attorney, Agent, or Firm* — Pepper Hamilton LLP

(57) ABSTRACT

Extracting gallium and/or arsenic from materials comprising gallium arsenide is generally disclosed. In some example embodiments, a material comprising gallium arsenide may be exposed to a first heating condition to form a first exhaust. The first exhaust may be directed to an arsenic collection bed including aluminum, which may form aluminum arsenide. The material including gallium arsenide may be exposed to a second heating condition and/or a vacuum may be applied, which may form a second exhaust. The second exhaust may be directed to a gallium collection bed including aluminum, which may form gallium alloys of aluminum.

15 Claims, 5 Drawing Sheets

(56) References Cited

U.S. PATENT DOCUMENTS

| | | | |
|---|---|---|---|
| 4,808,221 A * | 2/1989 | Clement, II | C22B 7/02 423/88 |
| 4,812,167 A | 3/1989 | Inooka | |
| 6,126,719 A * | 10/2000 | Sturgill | C22B 7/001 423/304 |
| 6,132,488 A * | 10/2000 | Hara | C22B 7/001 423/464 |
| 6,800,243 B2 | 10/2004 | Tetyukhin et al. | |
| 2012/0260774 A1 | 10/2012 | Sievers | |

FOREIGN PATENT DOCUMENTS

| | | |
|---|---|---|
| JP | 2002256355 A | 9/2002 |
| RU | 2122040 C1 | 11/1998 |
| WO | WO2012144973 A1 | 10/2012 |

OTHER PUBLICATIONS

Arsenic, http://en.wikipedia.org/wiki/Arsenic, printed from Internet Nov. 12, 2010.

Chen et al., Recovery of High-Purity Gallium from Water Grinding Wastes, *Environmental Information Archives*, ISEIS Publication Series No. P002, (2005), 3:278-285.

Donovan, Profits for GaAs—on—Si, http://www.eetimes.com/General/DisplayPrintViewContent?contentItemID=4042494 (Sep. 17, 2001).

Gallium, http://en.wikipedia.org/wiki/Gallium, printed from Internet Nov. 12, 2010.

Gallium-Aluminum, http://ask.metafilter.com/75147/GalliumAluminum, Oct. 31, 2007.

Hall et al., Coherent Light Emission from GaAs Junctions, *Physical Review Letters* (Nov. 1, 1962), 9(9):366-368.

Hamling et al., Design of Low Mass Furnaces for High Temperature, http://www.zircarceramics.com/featured_articles/lowmass.htm, Copyright 2001.

Inoue et al., Cloud point phenomena of polyoxyethylene-type surfactants in ionic liquid mixtures of emimBF$_4$ and hmimBF$_4$, *Journal of Colloid and Interface Science* (May 4, 2010), 348:522-528.

Jadvar et al., Recovery of Gallium and Arsenic from GaAs Water Manufacturing Slurries, *Environmental Progress* (Nov. 1991), 10(4):278-281.

Lee et al., A study on the extraction of gallium from gallium arsenide scrap, *Hydrometallurgy* (1998), 49:125-133.

Lifton, Byproducts IV: Gallium, http://resourceinvestor.com/News/2007/6/Pages/Byproducts-IV--Gallium.aspx, published Jun. 14, 2007.

Pyrox Thermique Materiaux, Tube Furnaces, http://www.pyrox.fr/en/laboratory-furnaces/tube-furnaces, printed from the Internet Jan. 4, 2011.

Swartzbaugh et al., Reduction of Arsenic Wastes in the Semiconductor Industry, National Risk Management Research Laboratory Office of Research and Development, U.S. Environmental Protection Agency, Cincinnati, Ohio (1998), pp. 1-61.

TriQuint Semiconductor, GaAs FETs, http://www.triquint.com/prodserv/foundry/GaAsFETs.com, printed from Internet Feb. 15, 2011.

Venere et al., New process generates hydrogen from aluminum alloy to run engines, fuel cells, http://news.uns.purdue.edu/x/2007a/070515WoodallHydrogen.html (May 15, 2007).

Yang et al., Monodispersed microcapsules enclosing ionic liquid of 1-butyl-3-methylimidazolium hexafluorophosphate, *Reactive & Functional Polymers* (Nov. 28, 2006), 67:81-86.

* cited by examiner

EXTRACTION OF GALLIUM AND/OR ARSENIC FROM GALLIUM ARSENIDE

CROSS-REFERENCE TO RELATED APPLICATION

This application is a divisional under 35 U.S.C. §121 of U.S. patent application Ser. No. 13/388,142 now U.S. Pat. No. 8,603,216, which in turn is a U.S. national stage filing under 35 U.S.C. §371 of International Application No. PCT/US2011/032827 filed on Jan. 31, 2012. All the prior filed applications are incorporated herein by reference in its entirety.

BACKGROUND

The present disclosure generally pertains to extracting gallium and/or arsenic from gallium arsenide and, more particularly, to extracting gallium and/or arsenic from waste materials comprising gallium arsenide.

SUMMARY

Techniques for extracting gallium and/or arsenic from gallium arsenide are generally disclosed. Some example embodiments may include methods and/or systems for processing material(s) comprising gallium arsenide. For example, some described methods and/or systems may be used for processing waste materials including gallium arsenide.

Some example methods of processing a material including gallium arsenide according to the present disclosure may include exposing a material including gallium arsenide to a first heating condition (e.g., about 415 degrees C. to less than about 1100 degrees C.) to form a first exhaust. The first exhaust may be directed to an arsenic collection bed including aluminum, which may form aluminum arsenide. The material including gallium arsenide may be exposed to a second heating condition (e.g., above about 1100 degrees C.) and/or a vacuum may be applied, which may form a second exhaust. The second exhaust may be directed to a gallium collection bed including aluminum, which may form gallium alloys of aluminum.

Some example systems for processing a material comprising gallium arsenide according to the present disclosure may include at least one furnace configured to heat a material including gallium arsenide to a first heating condition (e.g., about 415 degrees C. to less than about 1100 degrees C.) and/or to a second heating condition (e.g., above about 1100 degrees C.). An arsenic collection bed housing an arsenic collection medium including aluminum may be connected to the furnace to receive a first exhaust produced by the material undergoing the first heating condition. A gallium collection bed housing a gallium collection medium including aluminum may be connected to the furnace to receive a second exhaust produced by the material undergoing the second heating condition. A vacuum apparatus may be connected to the gallium collection bed and/or may be configured to draw a vacuum on the furnace, such as during the second heating condition.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings.

DETAILED DESCRIPTION

Figure 1:
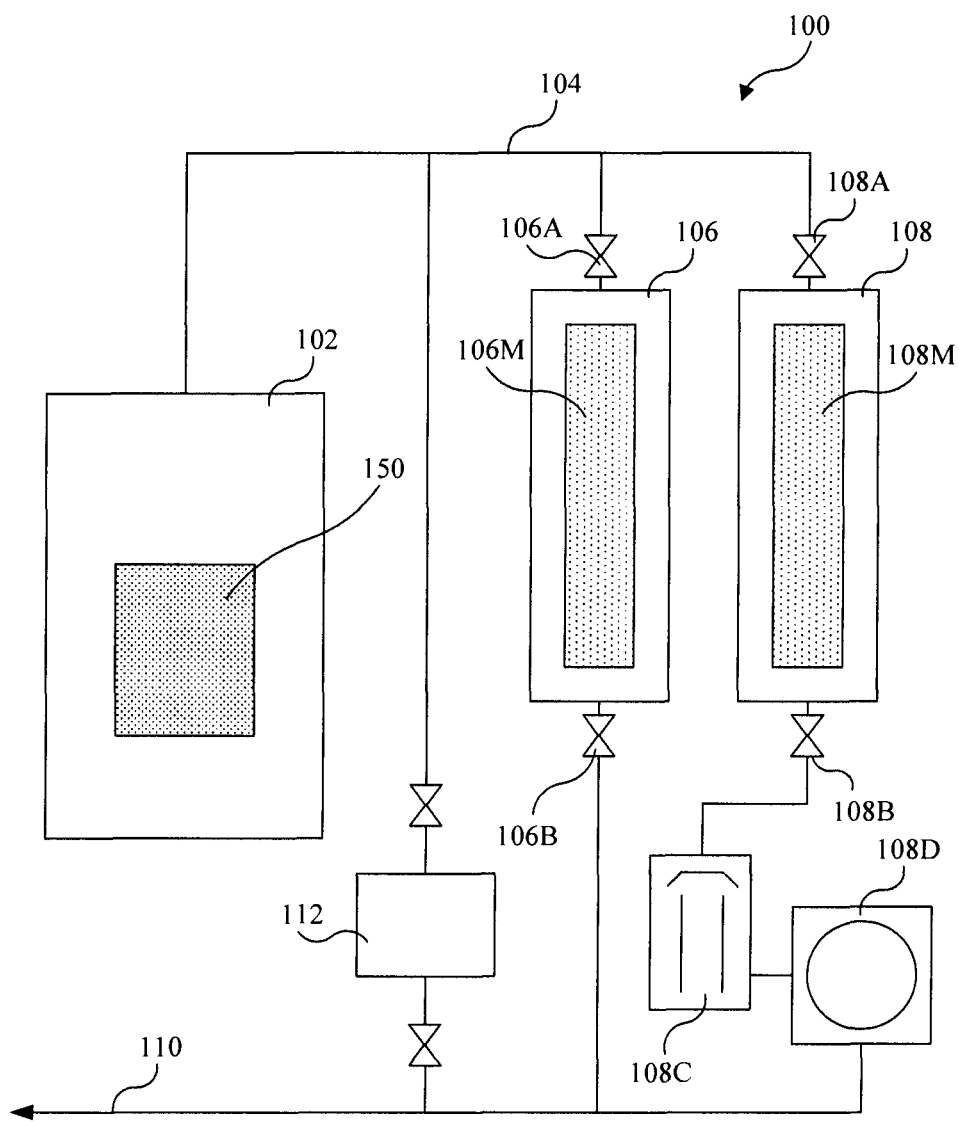
FIG. 1 is a block diagram of an example system for processing a material comprising gallium arsenide including collection beds arranged in parallel.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and make part of this disclosure.

Methods, systems, devices, and/or apparatus related to extracting gallium and/or arsenic from gallium arsenide are described. Some example embodiments according to the present disclosure may pertain to extracting gallium and/or arsenic from waste materials comprising gallium arsenide.

In some example embodiments according to the present disclosure, a material comprising gallium arsenide may be heated to vaporize at least some of the arsenic, which may be directed to an arsenic collection bed. Then, the material comprising gallium arsenide may be heated and/or a vacuum may be applied to vaporize at least some of the gallium, which may be directed to a gallium collection bed.

The materials comprising gallium arsenide can generally be any materials comprising gallium arsenide. Some solid state devices may include gallium (Ga) and/or arsenic (As), sometimes in the form of gallium arsenide (GaAs). For example, GaAs may be used in some light emitting diodes, transistors, semiconductor wafers, high speed computers, and/or microwave and millimeter wave integrated circuits.

The present disclosure contemplates that some other processes for extracting gallium and/or arsenic from GaAs may be complex, expensive, and/or inconvenient. Some processes may rely on multiple different procedures to separate gallium and arsenic from a waste material. For example, gallium and arsenic may be extracted from a waste material using acidic extraction. The resulting solution may then be pH adjusted to precipitate the gallium and arsenic as their hydroxide solids. The resulting solids may be dried and then heat treated. The heat treatment may volatilize the arsenic compounds, which may be collected in a vapor condensation apparatus. The remaining solids may then be dissolved and electrolytically treated to produce gallium liquid. While such multi-step procedures may be effective, the present disclosure contemplates that simpler systems and/or methods for extracting gallium and/or arsenic from GaAs may be useful.

The present disclosure contemplates that the sublimation point of arsenic may be about 615 degrees C. and that the boiling point of gallium may be about 2204 degrees C. Thus, when a material comprising GaAs is heated, the arsenic may vaporize at lower temperatures than the gallium. The present disclosure contemplates that the vapor pressure of gallium at about 1300 degrees C. may be about 100 Pa. Thus, in some example embodiments according to the present disclosure, a vacuum may be applied to accelerate removal of the gallium at temperatures below its boiling point. In some example embodiments according to the present disclosure, a material comprising GaAs may be crushed, chopped, and/or pulverized prior to heating. Some pre-treatments may increase the surface area of the material comprising GaAs. For example, the material comprising GaAs may comprise particles about 1 μm in size.

The present disclosure contemplates that aluminum may form a stable alloy with gallium. For example, aluminum turnings held at temperatures between about 30 degrees C. and about 660 degrees C. may readily form a gallium aluminum alloy. Similarly, the present disclosure contemplates that aluminum exposed to arsenic vapors may form aluminum arsenide (AlAs). Thus, some arsenic and/or gallium collection beds according to the present disclosure may comprise aluminum, such as aluminum powder and/or turnings. Some example aluminum powder may comprise particles about 1 μm in size.

FIG. 1 is a block diagram of an example system 100 for processing a material comprising gallium arsenide including collection beds arranged in parallel, in accordance with at least some embodiments of the present disclosure. System 100 may include a furnace 102, which may be fluidicly coupled (e.g., by conduit 104) to an arsenic collection bed 106 and/or a gallium collection bed 108. Furnace 102 may be configured to heat a material 150 comprising GaAs to a first heating condition (e.g., about 415 degrees C. to less than about 1100 degrees C.) and/or to a second heating condition (e.g., above about 1100 degrees C.). Arsenic collection bed 106 may be connected to an exhaust line 110. Gallium collection bed 108 may be connected to the exhaust line 110 via a vacuum apparatus, such as a momentum transfer pump 108C (e.g., an oil diffusion pump) and/or a mechanical pump 108D (e.g., a positive displacement pump). Arsenic collection bed 106 and/or gallium collection bed 108 may include an inlet isolation valve 106A, 108A coupled to conduit 104 and/or an outlet isolation valve 106B, 108B coupled to exhaust line 110. Arsenic collection bed 106 may include an arsenic collection medium 106M (e.g., aluminum powder) and/or gallium collection bed 108 may include a gallium collection medium 108M (e.g., aluminum powder).

In some example embodiments, analytical equipment 112 may be operatively coupled to conduit 104 and/or exhaust line 110. One or more pieces of analytical equipment 112 may be used, and one or more pieces of analytical equipment 112 may be connected at various places in system 100. Example analytical equipment may include atomic emission spectroscopy apparatus, mass spectrometry apparatus, and/or x-ray fluorescence apparatus. Drawing from conduit 104, analytical equipment 112 may detect evolution of Ga and/or As from material 150, which may increase during a heating condition and/or which may decrease and/or substantially stop once extraction of Ga and/or As from material 150 is substantially complete. Drawing from exhaust line 110, analytical equipment 112 may detect Ga and/or As if the capacity of arsenic collection bed 106 and/or gallium collection bed 108 is exceeded. Some example embodiments may include analytical equipment configured to test material 150 prior to heating, which detect whether material 150 contains GaAs. If material 150 does not contain GaAs, extraction of gallium and/or arsenic may not be desired.

System 100 may be operated as follows. Material 150 may be heated in furnace 102 to the first heating condition to produce a first exhaust comprising vaporized arsenic. The first exhaust may be directed to arsenic collection bed 106 by opening arsenic collection bed inlet isolation valve 106A and arsenic collection bed outlet isolation valve 106B and/or by shutting gallium collection bed inlet isolation valve 108A and gallium collection bed outlet isolation valve 108B. The first exhaust may be analyzed (e.g., using analytical equipment 112) to determine when substantially all of the arsenic in material 150 has been removed. Then, material 150 may be heated in furnace 102 to the second heating condition to produce a second exhaust comprising vaporized gallium. The second exhaust may be directed to gallium collection bed 108 by opening gallium collection bed inlet isolation valve 108A and gallium collection bed outlet isolation valve 108B and/or by shutting arsenic collection bed inlet isolation valve 106A and arsenic collection bed outlet isolation valve 106B. The vacuum apparatus may be operated to draw a vacuum on furnace 102. The second exhaust may be analyzed (e.g., using analytical equipment 112) to determine when substantially all of the gallium in the material 150 has been removed.

Figure 2:
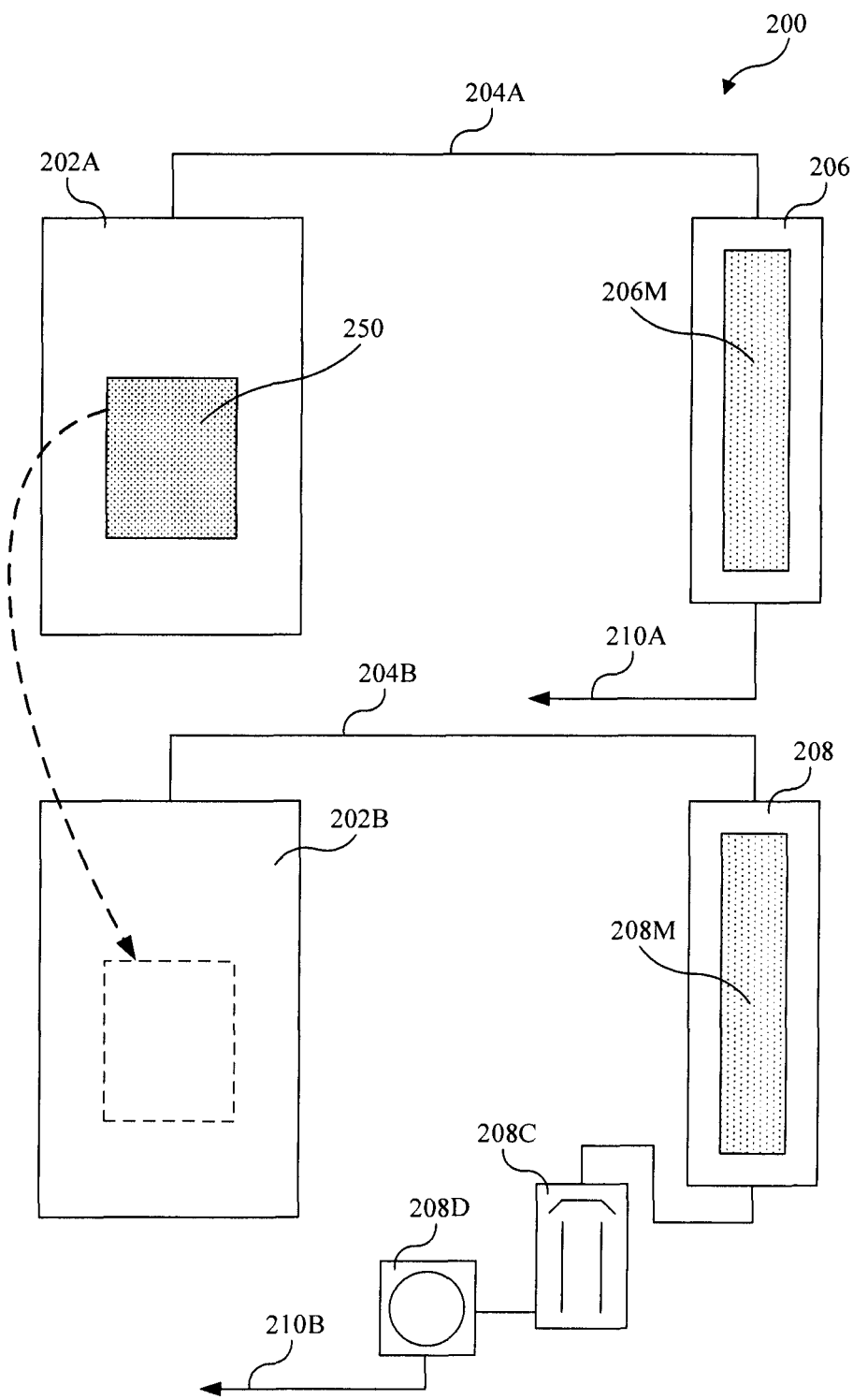
FIG. 2 is a block diagram of an example system for processing a material comprising gallium arsenide including multiple furnaces.

FIG. 2 is a block diagram of an example system 200 for processing a material comprising gallium arsenide including multiple furnaces, arranged in accordance with at least some embodiments of the present disclosure. System 200 may include two furnaces 202A, 202B, which may receive a material 250 comprising GaAs. First furnace 202A may be configured to heat material 250 to a first heating condition and/or may be fluidicly coupled (e.g., by conduit 204A) to an arsenic collection bed 206, which may include an arsenic collection medium 206M. Second furnace 202B may be configured to heat material 250 to a second heating condition and/or may be fluidicly coupled (e.g., by conduit 204B) to a gallium collection bed 208, which may include a gallium collection medium 208M. Arsenic collection bed 206 may be connected to an exhaust line 210A. Gallium collection bed 208 may be connected to the exhaust line 210B via a vacuum apparatus, such as a momentum transfer pump 208C and/or a mechanical pump 208D.

System 200 may be operated as follows. Material 250 may be heated in furnace 202A to the first heating condition to produce a first exhaust comprising vaporized arsenic. The first exhaust may be directed to arsenic collection bed 206. The first exhaust may be analyzed to determine when substantially all of the arsenic in material 250 has been removed. Then, material 250 may be transferred to furnace 202B, where it may be heated to the second heating condition to produce a second exhaust comprising vaporized gallium. The second exhaust may be directed to gallium collection bed 208. The vacuum apparatus may be operated to draw a vacuum on furnace 202B. The second exhaust may be analyzed to determine when substantially all of the gallium in the material 250 has been removed.

Figure 3:
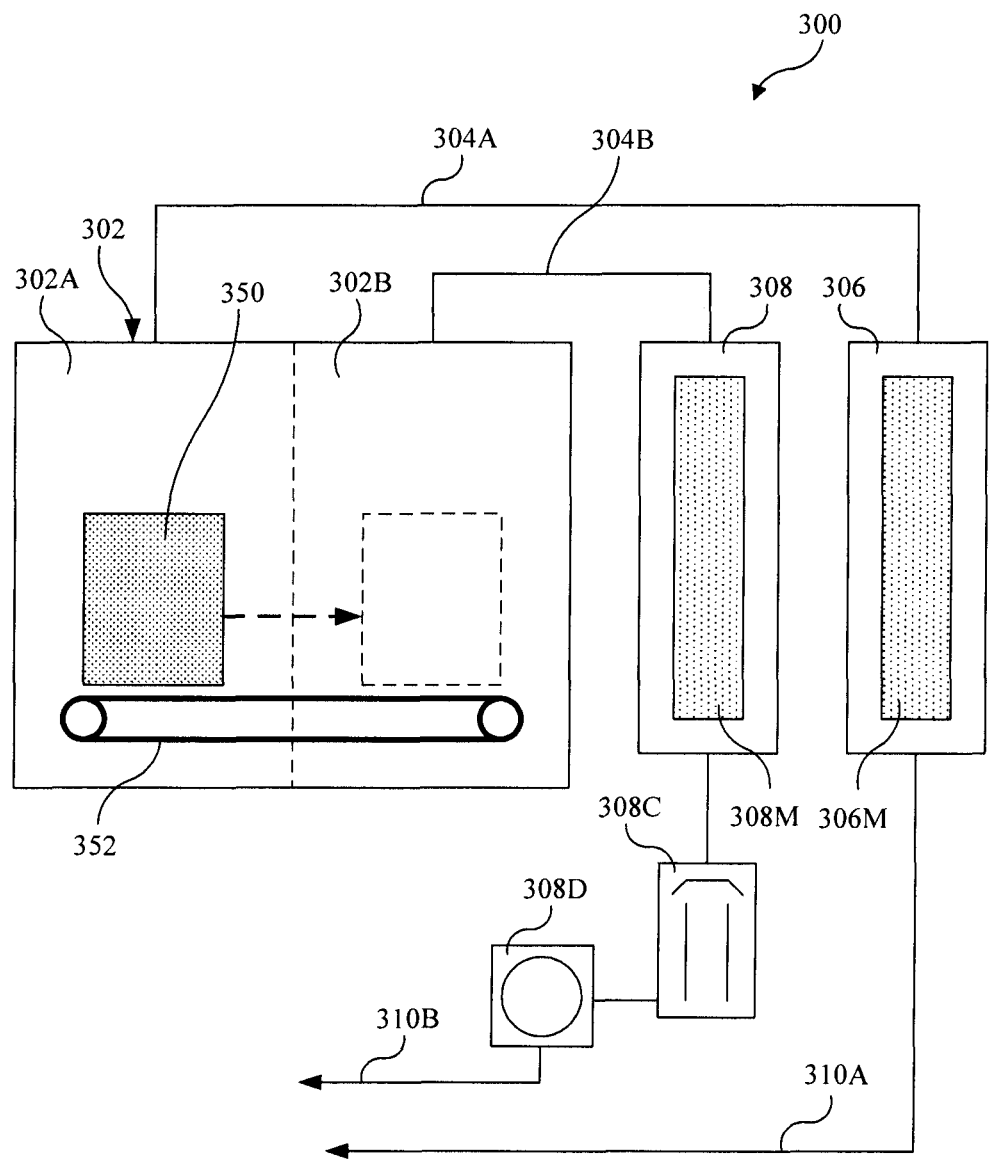
FIG. 3 is a block diagram of an example system for processing a material comprising gallium arsenide including a multi-zone furnace.

FIG. 3 is a block diagram of an example system 300 for processing a material comprising gallium arsenide including a multi-zone furnace, arranged in accordance with at least some embodiments of the present disclosure. System 300 may include a furnace 302, which may include a first zone 302A and/or a second zone 302B, which may receive a material 350 comprising GaAs. First zone 302A may be configured to heat the material 350 to a first heating condition and/or may be fluidicly coupled (e.g., by conduit 304A) to an arsenic collection bed 306, which may include an arsenic collection medium 306M. Second zone 302B may be configured to heat the material 350 to a second heating condition and/or may be fluidicly coupled (e.g., by conduit 304B) to a gallium collection bed 308, which may include a gallium collection medium 308M. Arsenic collection bed 306 may be connected to an exhaust line 310A. Gallium collection bed 308 may be connected to an exhaust line 310B via a momentum transfer pump 308C and/or a mechanical pump 308D. Some example embodiments may include a conveyor 352 configured to transfer material 350 between first zone 302A and second zone 302B.

System 300 may be operated as follows. Material 350 may be heated in first zone 302A of furnace 302 to the first heating condition to produce a first exhaust comprising vaporized arsenic. The first exhaust may be directed to arsenic collection bed 306. The first exhaust may be analyzed to determine when substantially all of the arsenic in material 350 has been removed. Then, material 350 may be transferred (e.g., using conveyor 352) to second zone 302B of furnace 302, where it may be heated to the second heating condition to produce a second exhaust comprising vaporized gallium. The second exhaust may be directed to gallium collection bed 308. The vacuum apparatus may be operated to draw a vacuum on second zone 302B of furnace 302. The second exhaust may be analyzed to determine when substantially all of the gallium in the material 350 has been removed.

Figure 4:
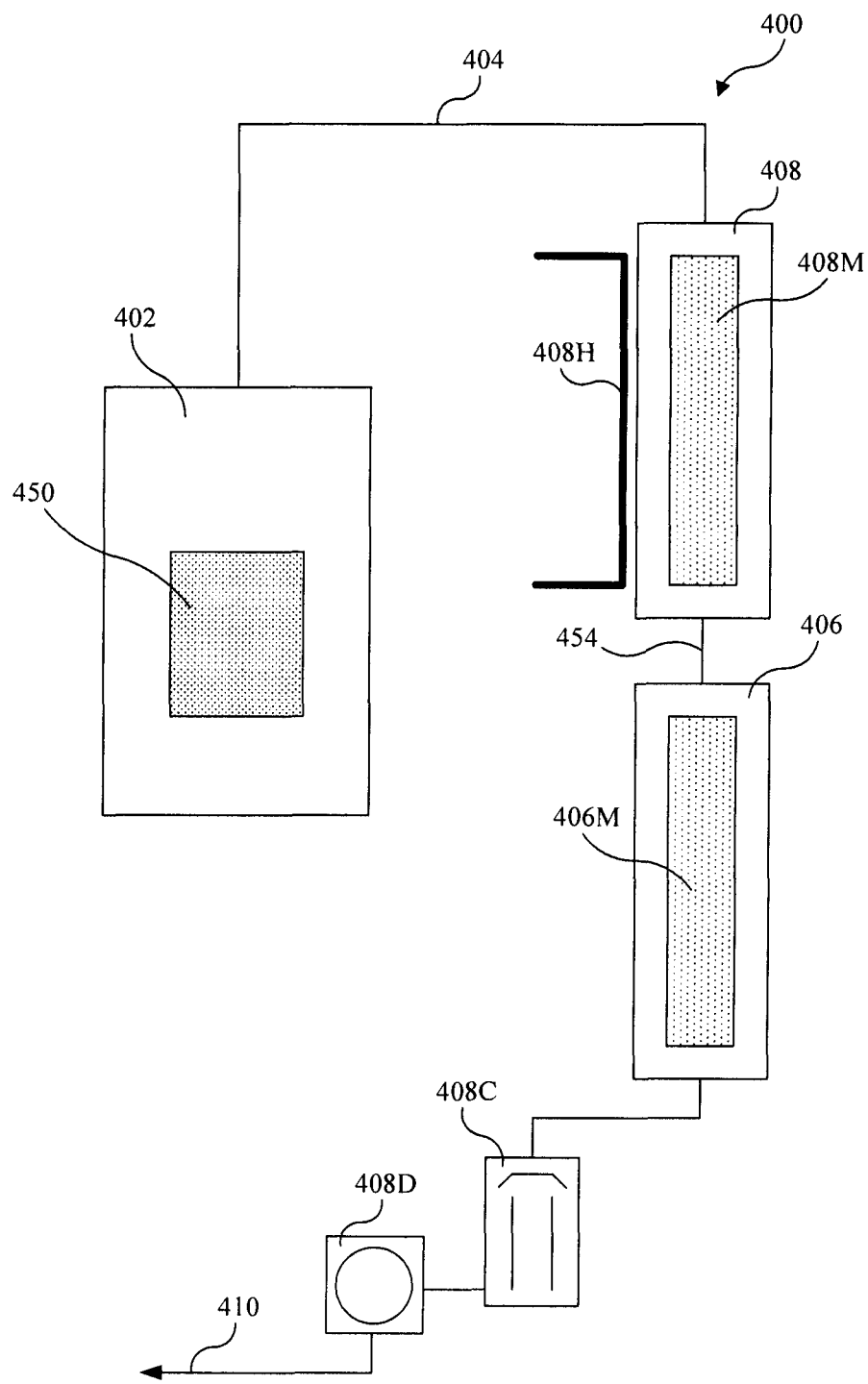
FIG. 4 is a block diagram of an example system for processing a material comprising gallium arsenide including collection beds arranged in series.

FIG. 4 is a block diagram of an example system 400 for processing a material comprising gallium arsenide including collection beds arranged in series, arranged in accordance with at least some embodiments of the present disclosure. System 400 may include a furnace 402, which may receive a material 450 comprising GaAs. Furnace 402 may be fluidicly coupled (e.g., by a conduit 404) to a gallium collection bed 408, which may be fluidicly coupled (e.g., by a conduit 454) to an arsenic collection bed 406 in a series arrangement. Arsenic collection bed 406 may be connected to an exhaust line 410 via a vacuum apparatus, which may comprise a momentum transfer pump 408C and/or a mechanical pump 408D. Gallium collection bed 408 may include a gallium collection medium 408M and/or a heater 408H, which may be configured to maintain gallium collection bed 408 at an elevated temperature. Arsenic collection bed 406 may include an arsenic collection medium 406M.

System 400 may be operated as follows. Material 450 may be heated in furnace 402 to the first heating condition to produce a first exhaust comprising vaporized arsenic. The first exhaust may flow through gallium collection bed 408 to reach arsenic collection bed 406. Gallium collection bed 408 may be maintained at an elevated temperature (e.g., above about 1100 degrees C.), which may prevent substantial amounts of the vaporized arsenic from being captured by gallium collection medium 408M. For example, the elevated temperature may substantially prevent the formation of aluminum arsenide in gallium collection medium 408M. Thus, substantially all of the vaporized arsenic in the first exhaust may flow through gallium collection bed 408 to reach arsenic collection bed 406. The first exhaust may be analyzed to determine when substantially all of the arsenic in material 450 has been removed.

Then, material 450 may be heated in furnace 402 to the second heating condition to produce a second exhaust comprising vaporized gallium. The vacuum apparatus may be operated to draw a vacuum on furnace 402 via arsenic collection bed 406 and/or gallium collection bed 408. The second exhaust may flow to gallium collection bed 408, which may receive and/or may capture substantially all of the vaporized gallium in the second exhaust. The residual second exhaust may be discharged via arsenic collection bed 406, vacuum apparatus, and/or exhaust line 410. The second exhaust may be analyzed to determine when substantially all of the gallium in the material 450 has been removed.

Figure 5:
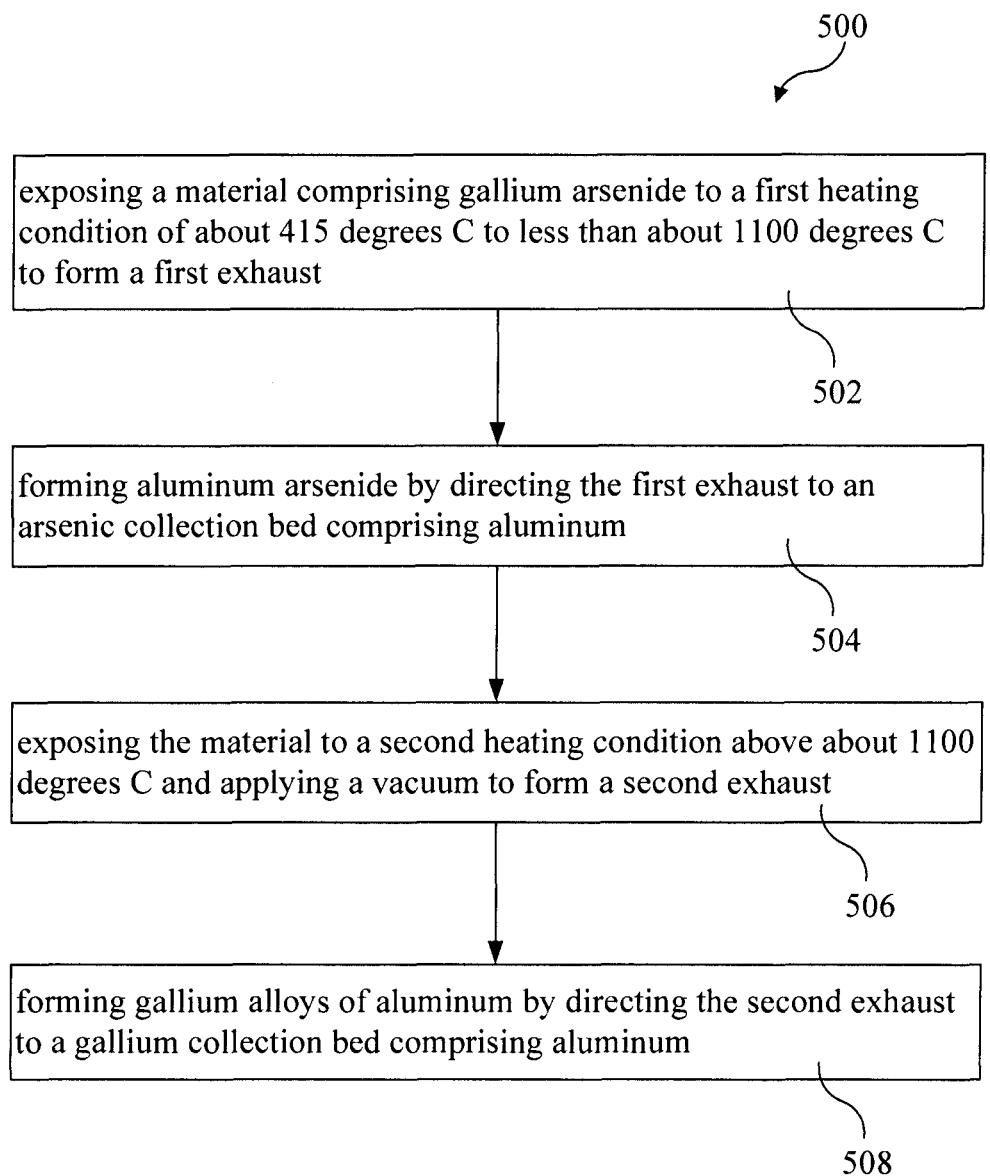
FIG. 5 is a flow chart illustrating an example method for processing a material comprising gallium arsenide, all arranged in accordance with at least some embodiments of the present disclosure.

FIG. 5 is a flow chart illustrating an example method 500 for processing a material comprising gallium arsenide, in accordance with at least some embodiments of the present disclosure. Method 500 may include operation 502, which may include exposing a material comprising gallium arsenide to a first heating condition, such as about 415 degrees C. to less than about 1100 degrees C. to form a first exhaust. Operation 504 may follow operation 502 and/or may include forming aluminum arsenide by directing the first exhaust to an arsenic collection bed, which may comprise aluminum. Operation 506 may follow operation 504 and/or may include exposing the material to a second heating condition, such as above about 1100 degrees C. and/or applying a vacuum to form a second exhaust. Operation 508 may follow operation 506 and/or may include forming gallium alloys of aluminum by directing the second exhaust to a gallium collection bed, which may comprise aluminum.

In a detailed example method according to the present disclosure, the first heating condition may be about 515 degrees C. to about 715 degrees C. Specific examples of the first heating condition include about 515 degrees C., about 525 degrees C., about 550 degrees C., about 575 degrees C., about 600 degrees C., about 625 degrees C., about 650 degrees C., about 675 degrees C., about 700 degrees C., about 715 degrees C., and ranges between any two of these values. In a detailed example method according to the present disclosure, the first heating condition may be about 615 degrees C.

In a detailed example method according to the present disclosure, the second heating condition may be about 1200 degrees C. to about 1400 degrees C. Specific examples of the second heating condition include about 1200 degrees C., about 1225 degrees C., about 1250 degrees C., about 1275 degrees C., about 1300 degrees C., about 1325 degrees C., about 1350 degrees C., about 1375 degrees C., about 1400 degrees C., and ranges between any two of these values. In a detailed example method according to the present disclosure, the second heating condition may be about 1300 degrees C.

In a detailed example method according to the present disclosure, the vacuum may be about 1 mTorr to about 1 Torr in pressure. Specific examples of the vacuum include about 1 mTorr, about 2 mTorr, about 5 mTorr, about 10 mTorr, about 100 mTorr, about 1 Torr, and ranges between any two of these values. In a detailed example method according to the present disclosure, the vacuum may be about 2 mTorr in pressure.

Some example embodiments according to the present disclosure may be useful for recycling semiconductor waste comprising GaAs. For example, recycling centers accepting used semiconductor devices may employ embodiments according to the present disclosure to remove arsenic from their industrial waste streams. As another example, semiconductor fabrication facilities may use embodiments according to the present disclosure to recycle scrap materials comprising GaAs that are produced as part of a semiconductor manufacturing process.

Arsenic captured by arsenic collection medium 106M, 206M, 306M, 406M and/or gallium captured by gallium collection medium 108M, 208M, 308M, 408M may be reused, such as for manufacturing semiconductors. The arsenic and/or the gallium may be removed from the collection media by heating the collection media, which may comprise aluminum arsenide and/or gallium alloys of aluminum.

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A system for processing a material comprising gallium arsenide, the system comprising:
    one or more furnaces configured to heat the material comprising gallium arsenide to a first heating condition of about 415 degrees C. to less than about 1100 degrees C. and to a second heating condition of above about 1100 degrees C.;
    an arsenic collection bed housing an arsenic collection medium comprising aluminum, wherein the aluminum is configured to react with arsenic, and wherein the arsenic collection bed is fluidicly coupled to the one or more furnaces to receive a first exhaust produced by the material undergoing the first heating condition;
    a gallium collection bed housing a gallium collection medium comprising aluminum, wherein the aluminum is configured to react with gallium, and wherein the gallium collection bed is fluidicly coupled to the one or more furnaces to receive a second exhaust produced by the material undergoing the second heating condition; and
    a vacuum apparatus fluidicly coupled to the gallium collection bed and configured to draw a vacuum on the one or more furnaces during the second heating condition; further comprising an arsenic collection bed isolation valve fluidicly interposing the one or more furnaces and the arsenic collection bed; and a gallium collection bed isolation valve fluidicly interposing the one or more furnaces and the gallium collection bed.

2. The system of claim 1, wherein the gallium collection bed and the arsenic collection bed are fluidicly coupled to the one or more furnaces in series such that the first exhaust and the second exhaust flow through the gallium collection bed to reach the arsenic collection bed.

3. The system of claim 2, wherein the gallium collection bed comprises a heater configured to maintain the gallium collection medium at above about 1100 degrees C.

4. The system of claim 1,
wherein the one or more furnaces comprises a first furnace and a second furnace; wherein the first furnace is configured to heat the material to the first heating condition and is fluidicly coupled to the arsenic collection bed; and
wherein the second furnace is configured to heat the material to the second heating condition and is fluidicly coupled to the gallium collection bed.

5. The system of claim 1, wherein the one or more furnaces comprise a multi-zone furnace comprising a first zone configured to heat the material to the first heating condition and a second zone configured to heat the material to the second heating condition.

6. The system of claim 5, wherein the multi-zone furnace comprises a conveyor arranged to move the material from the first zone to the second zone.

7. The system of claim 1, wherein the vacuum apparatus comprises one or more of a positive displacement pump and a momentum transfer pump.

8. The system of claim 1, wherein the arsenic collection medium comprises aluminum powder particles of about 1 μm in size.

9. The system of claim 1, wherein the gallium collection medium comprises aluminum powder particles of about 1 μm in size.

10. The system of claim 1, wherein the one or more furnaces are configured to heat a material comprising gallium arsenide to the first heating condition of about 515 degrees C. to about 715 degrees C.

11. The system of claim 1, wherein one or more furnaces are configured to heat the material comprising gallium arsenide to the second heating condition of about 1200 degrees C. to about 1400 degrees C.

12. The system of claim 1, further comprising one or more analytical equipments coupled to a conduit between the one or more furnaces and the arsenic collection bed.

13. The system of claim 12, wherein the one or more analytical equipments comprise an atomic emission spectroscopy apparatus, a mass spectroscopy apparatus, and an X-ray fluorescence apparatus.

14. The system of claim 1, further comprising one or more analytical equipments coupled to a conduit between the one or more furnaces and the gallium collection bed.

15. The system of claim 14, wherein the one or more analytical equipments comprise an atomic emission spectroscopy apparatus, a mass spectroscopy apparatus, and an X-ray fluorescence apparatus.

* * * * *